Oct. 13, 1953  R. C. ABELSON  2,655,556

SYNCHRONIZING SYSTEM

Filed Dec. 30, 1949  3 Sheets-Sheet 1

Inventor
ROBERT C. ABELSON
By [signature]
Attorney

Oct. 13, 1953 R. C. ABELSON 2,655,556

SYNCHRONIZING SYSTEM

Filed Dec. 30, 1949 3 Sheets-Sheet 2

Inventor

ROBERT C. ABELSON

By

Oliver J. Mitchell

Attorney

Inventor
ROBERT C. ABELSON
By
Olin C. Mitchell
Attorney

Patented Oct. 13, 1953

2,655,556

UNITED STATES PATENT OFFICE 2,655,556

SYNCHRONIZING SYSTEM

Robert C. Abelson, Chattanooga, Tenn., assignor to Radio Corporation of America, a corporation of Delaware Application December 30, 1949, Serial No. 136,047

8 Claims. (Cl. 178—69.5)

The present invention relates to synchronizing systems for electrical signal generators and more particularly, although not necessarily exclusively, to synchronizing lock-in methods and apparatus for remote and local television transmitting stations.

In more particularity, the present invention deals with an improved synhcronizing lock-in arrangement for synchronously relating the operation of remote and local sync generators in modern-day television transmitting apparatus.

In still another aspect, the present invention relates to an automatic synchronizing lock-in arrangement for a television transmission system in which it is desirable to interchangeably transmit either a remotely generated television signal or a locally generated television signal in such a manner as to eliminate evidence of discontinuity in the signal transmission during the transition from the remote to the local signal source.

The present invention further relates to an improvement in the synchronizing television synchronizing system shown and described in U. S. Patent No. 2,597,743, entitled "Synchronizing Systems" issued May 20, 1952, to F. W. Millspaugh et al.

As pointed out in the above-referenced U. S. patent, in television practice television transmitting stations transmit a composite television signal which mainly comprises a video component, a synchronizing component and a blanking component. Generally, the synchronizing and blanking components are generated by a sync signal generating system preferably located at a position near the point of image pick up. A version of the synchronizing and blanking information is, of course, supplied to the image pick-up equipment for synchronization of its scanning action in the production of the video signal. The synchronizing and blanking information is then mixed with the resulting image video signal to produce the composite signal for modulation of the television radio transmitter.

The sync signal generator for generating the synchronizing and blanking information is usually controlled by a master oscillator operating at a multiple of the image line frequency. In order to avoid drift in the operating frequency of the master oscillator and consequent irregularities in the reproduced television image, the master oscillator is commonly linked to some standard frequency source which, for example, may be the 60 cycle of the local public utilities power distribution system. A very convenient way of accomplishing this linkage is by means of comparing the field frequency rate of the field synchronizing pulse developed by the sync signal generator with the frequency of the local power line and correcting the frequency of the master oscillator in accordance with the degree of difference detected by this frequency comparison. Under proper operating conditions, this ensures that the transmitted vertical synchronizing signals are always in synchronism with the 60 cycle supply main. Such apparatus is well known in the art and one form widely used is described in detail in a paper by Smith and Bedford which appeared in the RCA Review for July 1940, vol. 5, No. 1, pages 51–68, "A precision television synchronizing signal generator."

Such a system is usually employed where only one sync signal transmitting chain is used or where program material originates only from scanning equipment operated by the local synchronizing signal generator. When, however, it is desired to transmit or retransmit program material originating from a remote location, it becomes desirable to supply some means for locking in the local sync generator with the remotely generated television signal. This lock-in feature is generally necessary because the remote pick-up equipment may be operated on an entirely different public utilities power supply system and hence be controlled in frequency and phase by a slightly different power line frequency from that of the main studios. If no lock-in feature is provided, switching from locally generated program material to remotely generated program material would result in a disturbance in the reproduced television image at television receiving locations due to discontinuity in synchronizing information applied to the television receiver beam deflection system.

Moreover, in the transmission of special effects such as "lap dissolve," video "wipes," or composite pictures by the superimposition of the remote and locally generated television signal, it is necessary to maintain precise synchronism and accurate phasing between the two signals undergoing the special effects process. For example, it is well known that failure to maintain proper lock-in between two superimposed television signals will create the effect of one picture drifting past the other. Correspondingly, improper synchronization in the case of the lap dissolve would produce a disagreeable displacement between the pictures being dissolved.

A number of systems have been provided in the art for accomplishing the necessary synchronization of the local sync generator with the remote television signal. In the majority of the television lock-in or synchronizing arrangements presently known, the incoming signal is visually compared with the locally generated signal by oscillographic examination of the respective remote and locally generated composite television signal synchronizing components. The local sync signal generator is then divorced from its control by the public utilities power main supply frequency and manually adjusted in operating frequency and phase until proper coincidence between the remote and local synchronizing components is realized. At the instant of coincidence, the local sync generator is then synchronized by the application of remotely generated sync signal separated from the remote composite television signal and is thereafter electrically and directly held in synchronism with the remote signal. Such an arrangement requires the presence of trained operating personnel to properly accomplish the lock-in operation.

In interlaced television systems with which the present invention is more directly concerned, the phasing between the remote and local signals just prior to lock-in poses a problem of even greater importance and requires additional caution on the part of the operator manually accomplishing the matching of signals. The additional phasing problem presented arises by merit of the fact that an interlaced television signal comprises alternate even and odd field representations. Each field is displaced from the other by one half a line vertical displacement in the reproduced image raster and consequently in an interlaced television signal, successive groups of line sync pulses embraced by the field blanking interval are not symmetrical. Thus, it appears that the mere superimposition of the field sync pulse of the remote television signal with a field sync pulse of the local television signal would not necessarily indicate a proper phasing relationship and "lock-in" of the systems, and such conditions may cause an improper field interlaced condition to exist when mixing the signals for special effects purposes.

It will thus be clear that it is necessary that the remote and local field sync signals not only coincide in timing phase but must also bear a coincident relationship with respect to the even or odd interlaced field scansions which they represent. Such considerations and a system for manually accomplishing a satisfactory lock-in between two television systems utilizing interlaced scansion is described in full detail in U. S. Patent 2,329,339 entitled "Electrical Circuit," issued September 14, 1943, to James Russell De Baun. Furthermore, in the above-referenced U. S. Patent No. 2,597,743, to F. W. Millspaugh et al., another form of manually-controlled lock-in system is disclosed having certain advantages over the De Baun arrangement.

The present invention overcomes some of the disadvantages found in all prior art manual systems by providing a wholly automatic means for accomplishing a precision lock-in between two unrelated television signals of the interlaced variety. Moreover, the present invention in addition to being wholly automatic and thus eliminating the need for providing a trained operator for relative synchronism of the unrelated signals further provides a lock-in system which has considerably higher speed of operation.

It is therefore a major object of the present invention to provide a new and improved method and apparatus for synchronizing electronic signal generating circuits.

Another object of the present invention is to provide a new and useful method and apparatus for automatically synchronizing present-day television type sync generators.

Another object of the present invention is to provide a new and improved synchronizing method and apparatus which permits the selection for transmission of one or more individually timed and generated video signals without producing "drop outs" or tearing of reproduced images based on the transmitted signal.

Still another object of the present invention is to provide a method and apparatus for automatically co-synchronizing a plurality of separately timed television signal sync generators in conjunction with special effects apparatus so as to improve the reproduced relationship between different image components of composite special effect scenes represented by the television signal.

In the synchronization of local sync generator operation by remote synchronizing signals, the present invention acts to first synchronize the local sync generator master oscillator operation with incoming remote horizontal sync signal with no regard to the relative overall phasing of the local and remote synchronizing signal composite wave forms. Means are then provided for interrupting the usual fixed timing and phase relationship between local master oscillator operation and the locally formed vertical sync so that the local vertical sync is effectively made to slip or shift with respect to local horizontal sync. This interrupting means is then placed under the automatic control of a coincidence detector which develops an actuating signal expressly for said interrupting means in accordance with a degree of coincidence between the remote vertical sync and local vertical sync. The speed of shift between local vertical sync and local horizontal sync is thereby rendered a positive function of the degree to which local and remote vertical sync fails to coincide. Hence, shift of local vertical sync will occur until coincidence of local and remote vertical sync is obtained at which time the interrupting means will be rendered of non-effect and lock-in between local and remote sync generators will be established.

In the application of the present invention to conventional local sync generators, employing a master oscillator whose output is coupled to horizontal and vertical sync shaping networks through regular frequency divider networks, having appropriate numerical values of count-down or dividing action, slippage or shift between the local vertical sync and the horizontal sync pulses may be accomplished in a variety of ways. For instance, in one examplary form of the present invention, an electronic switch or variable conductance channel is interposed between the output of the master oscillator and the input of the vertical frequency divider. This electronic switch is then controlled by a variable width control pulse which is developed by a vertical sync pulse comparator circuit. In the vertical sync pulse comparator circuit both local and horizontal vertical sync pulses are substractively combined so that there will be an output control pulse from the vertical sync comparator circuit only during intervals in which local and remote vertical sync pulses fail to coincide. Thus, under conditions of coincidence no control pulse for the electronic switch is developed and slippage or shift between the local vertical sync and horizontal sync pulses is discontinued, thereby allowing a continuance of lock-in between local and remote sync generators.

A more complete understanding of the operation of the present invention, as well as numerous other objects and features of advantage in addition to those set forth hereinabove, will be gleaned from a perusal of the following specification, especially when taken in connection with the accompanying drawings, in which Figure 1 is a combination block diagram and schematic illustration of one form of the present invention as embodied in a conventional type of television sync generator circuit;

Figure 1:
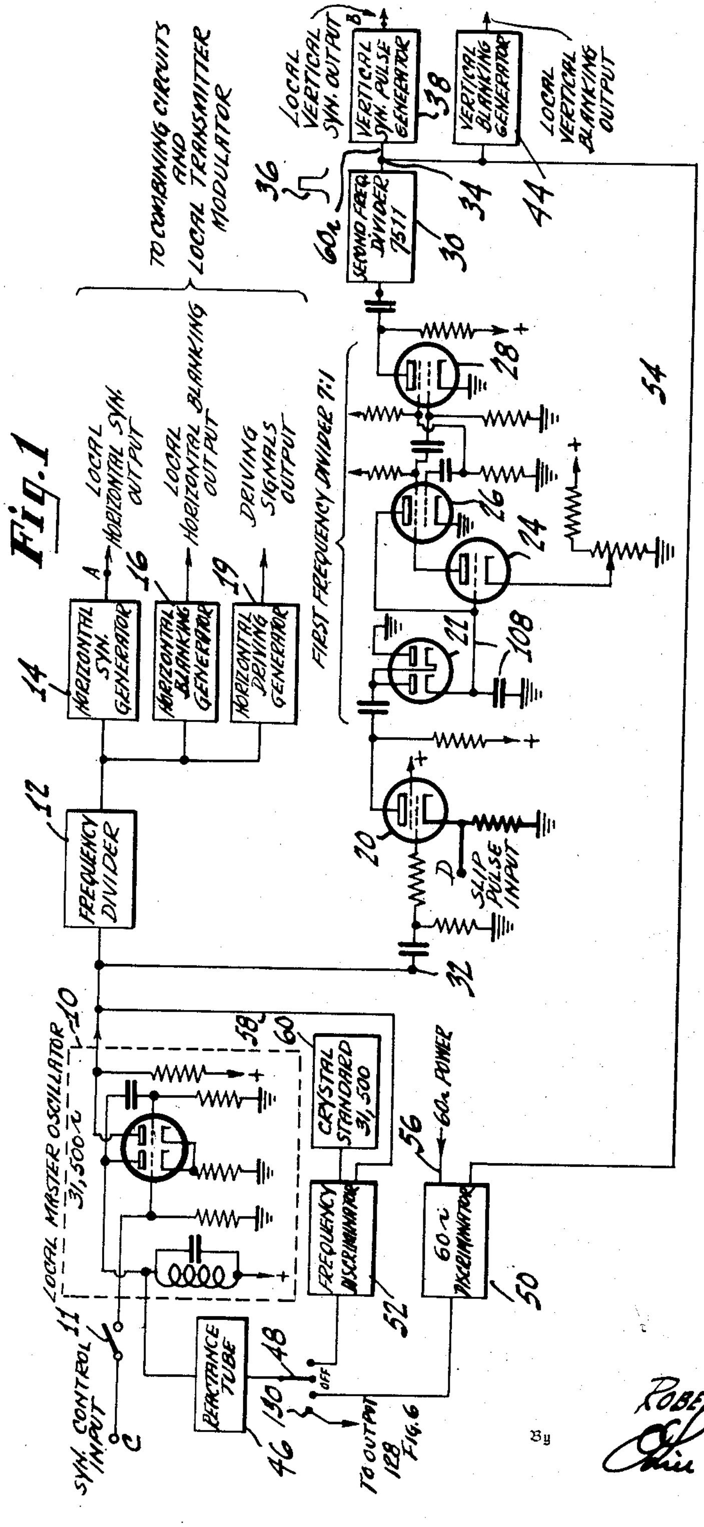

Turning now to Figure 1 in the drawings, there is illustrated in dotted line area 10 an exemplary form of a master oscillator circuit conventionally found in sync generator circuits. By way of example, the frequency of the oscillator has been indicated 31,500 C. P. S. which is in accordance with present-day television standards of a 525 line picture scanned in two interlaced fields of 262½ lines each. In accordance with conventional sync generator arrangements, the master oscillator 10 is applied to a horizontal frequency divider 12 which operates to divide in half the master oscillator frequency of 31,500 C. P. S. so as to provide at the input of the horizontal sync generator 14, control pulses having the required repetition rate of 15,750 C. P. S. These 15,750 C. P. S. control pulses are also applied to the horizontal driving generator 19. As is well known, the output of the generators 14, 16, and 19 are, as indicated, directed to combining and processing circuits for controlling subsequent modulation of the local television radio transmitter.

The output of the master oscillator 10 is further applied to the input of the first vertical frequency divider which comprises discharge tubes 20, 22, 24, 26 and 28. This first frequency divider is, by way of example, assigned a numerical divisor or count-down of 7 to 1 and is followed by a second vertical frequency divider indicated by block 30 which is adapted to execute 75 to 1 count-down. Thus, from the input terminal 32 of the first frequency divider to the output terminal 34 of the second frequency divider, there is executed the required 525 count-down which yields 60 cycle control pulses 36 at the output terminal 34. As in the case of the horizontal frequency divider output these control pulses are applied to the input of the vertical sync pulse generator 38 for control thereof. The vertical blanking generator 44 is, of course, also synchronized from the output of the second frequency divider 30. The outputs of the vertical sync generator and the blanking generator 38 and 44 are then applied to suitable combining and processing circuits for subsequent modulation of the local television radio transmitter in the same manner as the horizontal sync and horizontal blanking were handled.

There is further shown in the drawing means for controlling the frequency of the local master oscillator 10. As illustrated, this may take the form of a conventional reactance tube circuit 46 whose control signal input at terminal 48 may be selectively switched for conventional operation to either a 60-cycle power line frequency discriminator at 50 or a crystal standard 31,500 C. P. S. frequency discriminator at 52. The inputs to be compared by the 60-cycle frequency discriminator at 50, of course, may be taken from the output of the second frequency divider 30 via circuit path 54 and a connection 56 to the local power line voltage. Accordingly, the comparative inputs to the crystal standard frequency discriminator 52 may be obtained directly from the output of the local master oscillator 10 via circuit path 58 and the output of a standard 31,500 C. P. S. crystal at 60. It is noted that the switch connected to the input 48 of the reactance tube 46 is adapted for an "idle" or no-input position which position is illustrated in the drawing. This permits the local master oscillator 10 to have full control of the sync generator operation with no stabilization either from the power line frequency or crystal standard.

It is in this latter position of the switch connected with terminal 48 of the reactance tube that lock-in of the local sync generator may be accomplished with respect to a remote television signal such as, for example, received by a radio receiver 62. It is to this latter general type of master oscillator controlled lock-in that the present invention is related.

The general arrangement and type of elements thus far shown and described in the drawing as forming the atmosphere of the present invention are thought not to need further description due to their well-known natures. Furthermore, in the interests of more clearly and distinctly pointing out the present invention which will be more fully described hereinafter, no connections have been shown for generating and channeling the video frequency components of the television signal since these components have no relation to the interests of the present invention. More complete sync generator considerations dealing in more detail with the functions and characteristics of the individual sync generator elements thus far treated, as well as the complex nature of the synchronizing wave forms produced by sync generators of this general type, may be had through reference to an article by J. P. Smith and Alda V. Bedford, "A precision synchronizing generator" appearing in the RCA Review for July 1940, vol. 5, No. 1. This subject matter is further treated in detail in U. S. Patent 2,132,655 to J. P. Smith entitled "System for Producing Electrical Impulses," issued October 11, 1948. U. S. Patent No. 2,223,812, issued December 3, 1940, entitled "Television System" further describes the general requirements of synchronizing wave forms as applied to interlaced type television systems.

In accordance with the present invention the local master oscillator 10 as indicated above is adapted for control by the remote horizontal sync as received and demodulated by the radio receiver 62. This is accomplished by separating the remote horizontal sync from the output of the radio receiver 62 in any conventional manner, such as through the use of a well-known sync clipper 66 and sync separator 68. This separated remote horizontal sync is then in effect coupled to the sync control input terminal C of the local master oscillator 10 through a sync gating circuit illustrated in Fig. 3.

This sync gating circuit comprises a differentiator and inverter stage 70, a multivibrator circuit 72, mixer circuit 74, amplifier gate stage 76, limiter stage 78 and delay line 80. The remote horizontal sync to be coupled to the local master oscillator is then applied to the input of the differentiator and inverter stage 70 in which the sync is cleaned up, inverted and differentiated for synchronous control of the 15,750 C. P. S. cycle multivibrator 72. The output of the multivibrator pulse converter 72 is then applied to the input of the mixer 74 where it is combined with a delayed version of the local horizontal drive pulse generated by the generator 19 of the local sync generator in Fig. 1. This horizontal drive pulse is delayed by the delay line 82 and inverted and amplified by the apparatus in block 84. The inversion by the block 84 may be eliminated in some instances just as long as the pulses delivered to the mixer by the multivibrator 72 and the output of the inverter 84 are in the same direction, so that the output pulse 86 of the multivibrator may in effect ride on top of the local horizontal drive pulse 88 when remote horizontal sync happens to coincide with local horizontal drive. The threshold on the amplifier and gate 76 is then adjusted to pass only those signals having an amplitude in excess of the local horizontal drive pulse 88 so that only multivibrator pulses 86 will be applied to the input of the limiter 78. The output of the limiter may be delayed if desired by the delay line 80.

Figures 3, 4, 5:
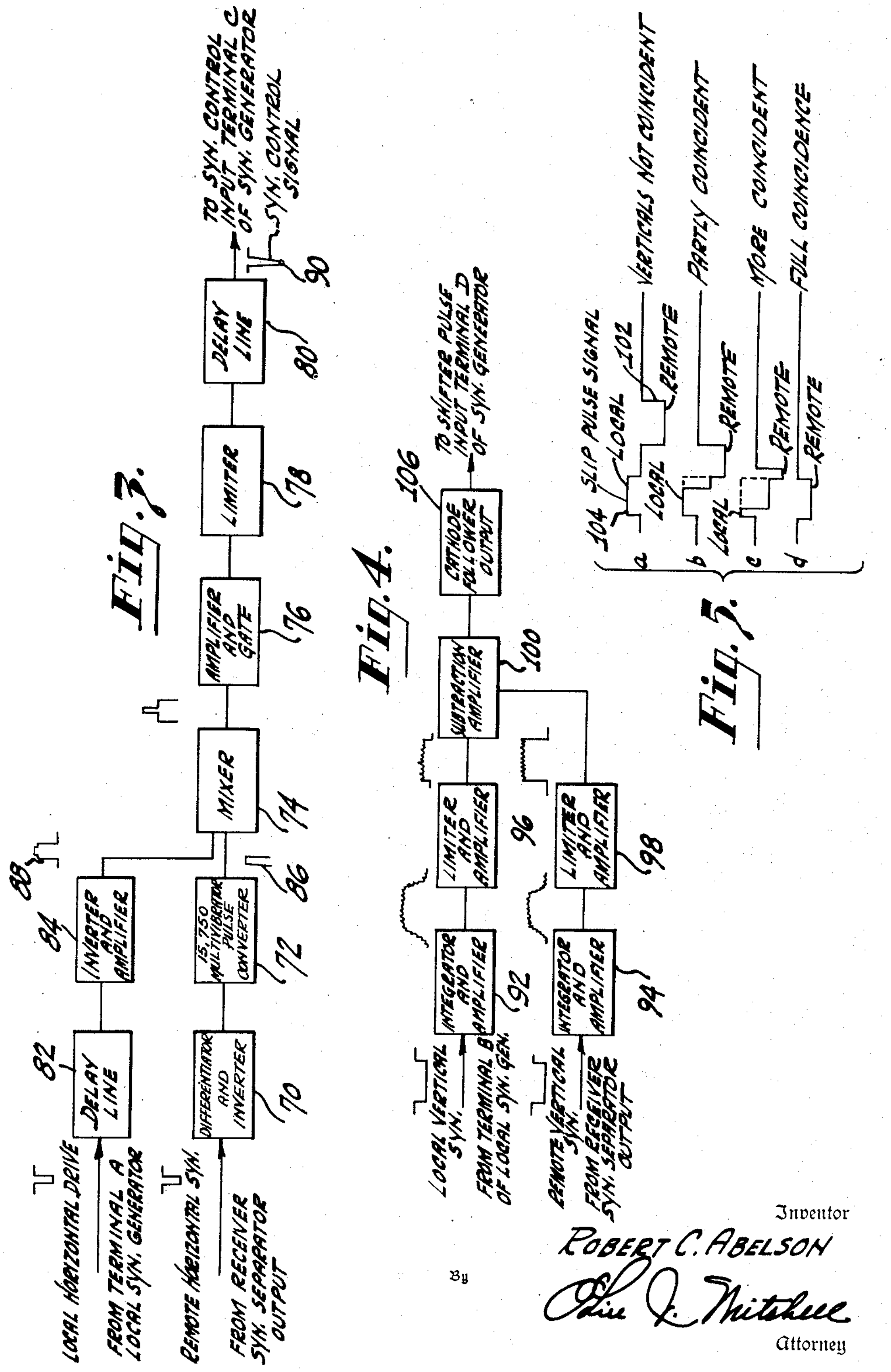
Figure 3 is a block diagram representation of certain signal processing circuits finding use in the practice of the present invention.
Figure 4 is an illustration in block diagram form of another circuit arrangement useful in the practice of the present invention.
Figure 5 illustrates electrical wave forms of a type which are characteristic of the operation of the present invention.

It will then be seen that the output of the horizontal sync gate circuit of Fig. 3 will comprise a pulse 90 which will exist only when local and remote horizontal sync coincide with one another. Thus, this output pulse 90 of the sync gate circuit may be used as a horizontal sync control signal for direct application to the sync control input terminal C of the local master oscillator 10 in Fig. 1. Accordingly, when the sync control input switch 11 of the local master oscillator is closed and the reactance tube selector switch 48 is in its "off" position, the local master oscillator 10 will run free until such time as a horizontal driving signal from the local sync generator happens to coincide with a remote horizontal sync pulse. At such time, the horizontal sync control signal 90 will synchronize the local master oscillator 10 and maintain line synchronization between the local and remote sync generators.

However, this will only establish part of the requirements for lock-in between the two sync generators, since the vertical sync pulses at the time of horizontal or line lock-in may have any phase relationship. Thus even remote fields may not be coincident with even local fields. Therefore, in accordance with the present invention there is illustrated in Fig. 4 a vertical coincidence detector which effectively compares the local vertical sync with remote vertical sync to determine the degree of coincidence between these sync pulses. The vertical coincidence detector comprises two processing networks for each of the local and vertical sync pulses respectively comprising integrator and amplifier circuits 92 and 94 and limiter and amplifier circuits 96 and 98. The output of the limiter and amplifier circuits are then supplied to a subtraction amplifier 100 which subtractively combines the output of the limiter amplifier 96 with the output of the limiter amplifier 98.

Considering now the mode of vertical sync comparator operation reference is directed to Figs. 5*a*, *b*, *c*, and *d* which illustrate the signal wave forms appearing at the output of a subtraction amplifier 100 under varying degrees of coincidence between local and remote vertical sync. Generally the amplitude of the output of one of the limiter and amplifier circuits 96 or 98 is made greater than the other, so that, as shown in Figs. 5*b*, 5*c*, and 5*d*, one pulse will of a certainty completely usurp the other for those portions of the pulses common to each other. In the case illustrated by Figs. 4 and 5 it can be seen that the remote vertical sync pulse 102 is made to have a substantially greater amplitude than the local vertical sync pulse 104. Thus, as shown in Fig. 5*a* under conditions of total non-coincidence between vertical sync pulses there will exist at the output of the subtraction amplifier 100, the positive going pulse 104 and the negative going pulse 102, the former being hereinafter referred to as a slip pulse. This slip pulse is applied through cathode follower 106 to the slip pulse input terminal D of the first frequency divider amplifier 20 in the sync generator of Fig. 1. The amplitude of the slip pulse signal 104 is made sufficiently great to substantially interfere with the energy representation of the master oscillator pulses delivered to the first frequency divider by the amplifier 20. In some cases the slip pulse signal should be great enough to actually cut off the amplifier 20 where in other cases such high amplitude is not required.

In operation it may be seen that the slip pulse 104 will reduce the amount of energy applied to the first frequency divider storage capacitor 108 for the duration of the slip pulse. This means that it will take a larger number of master oscillator signals to reach the firing threshold of the first frequency divider multivibrator control circuit 24, 26, 28. Reference page 28 of the above cited vol. 5 of the RCA Review will then show that this reduction of energy applied to capacitor 108 will increase the dividing factor of the first frequency divider to some numerical value above 7 and hence destroy the fixed frequency relationship heretofore existent between the local horizontal sync and the local vertical sync. Consequently the local vertical sync pulse will in effect be caused to slip relative to the local horizontal sync, that is, slip with respect to timing. This, of course, will also mean that the local vertical sync will shift with respect to the remote vertical sync. As the shifting continues, the local and remote sync will tend to come into greater coincidence as shown by curve 5*b* at which time the positive going slip pulse will become of less width. As it becomes of less width the amount of interruption of the first frequency divider count-down action will be less and will continue to keep decreasing until full coincidence between the remote and vertical sync occurs, at which time no positive going slip signal is present. This comes about by way of the fact that upon exact coincidence the higher amplitude negative going remote vertical sync signal completely usurps the lesser amplitude positive going local vertical sync. Therefore, the first frequency divider will no longer be interrupted by a slip pulse signal and complete stable lock-in between remote and local sync generators will be established.

It is well to note that the exact manner in which the slip pulse signal is produced is of no consequence to the present invention nor is the manner in which the slip pulse signal is applied for interruption of the first frequency divider critical. For instance, if the subtractive type of comparative system is used for the vertical sync pulses, it is possible to render the remote vertical sync of higher amplitude than the local vertical sync and apply a negative going slip pulse signal to the grid of the discharge tube 20. It would be further possible to rectify either a positive or negative going slip pulse signal as shown in Figs. 4 and 5 and apply the rectified D. C. to one or more of the multivibrators in the frequency divider chain. These as well as other variations of the present invention's novel technique will of course occur to those skilled in the art upon reference to the operation hereinbefore described.

Figure 2:
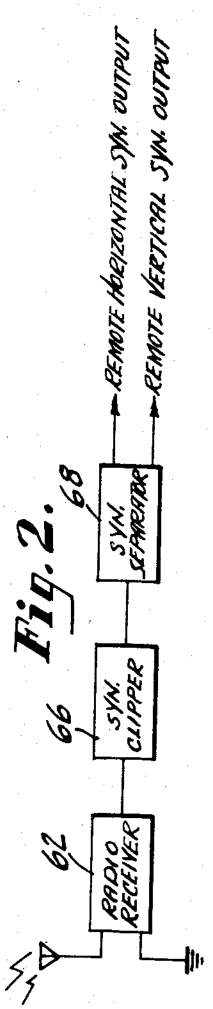
Figure 2 illustrates by block diagram a conventional form of television radio receiving systems used in connection with one aspect of the present invention.
Figure 6:
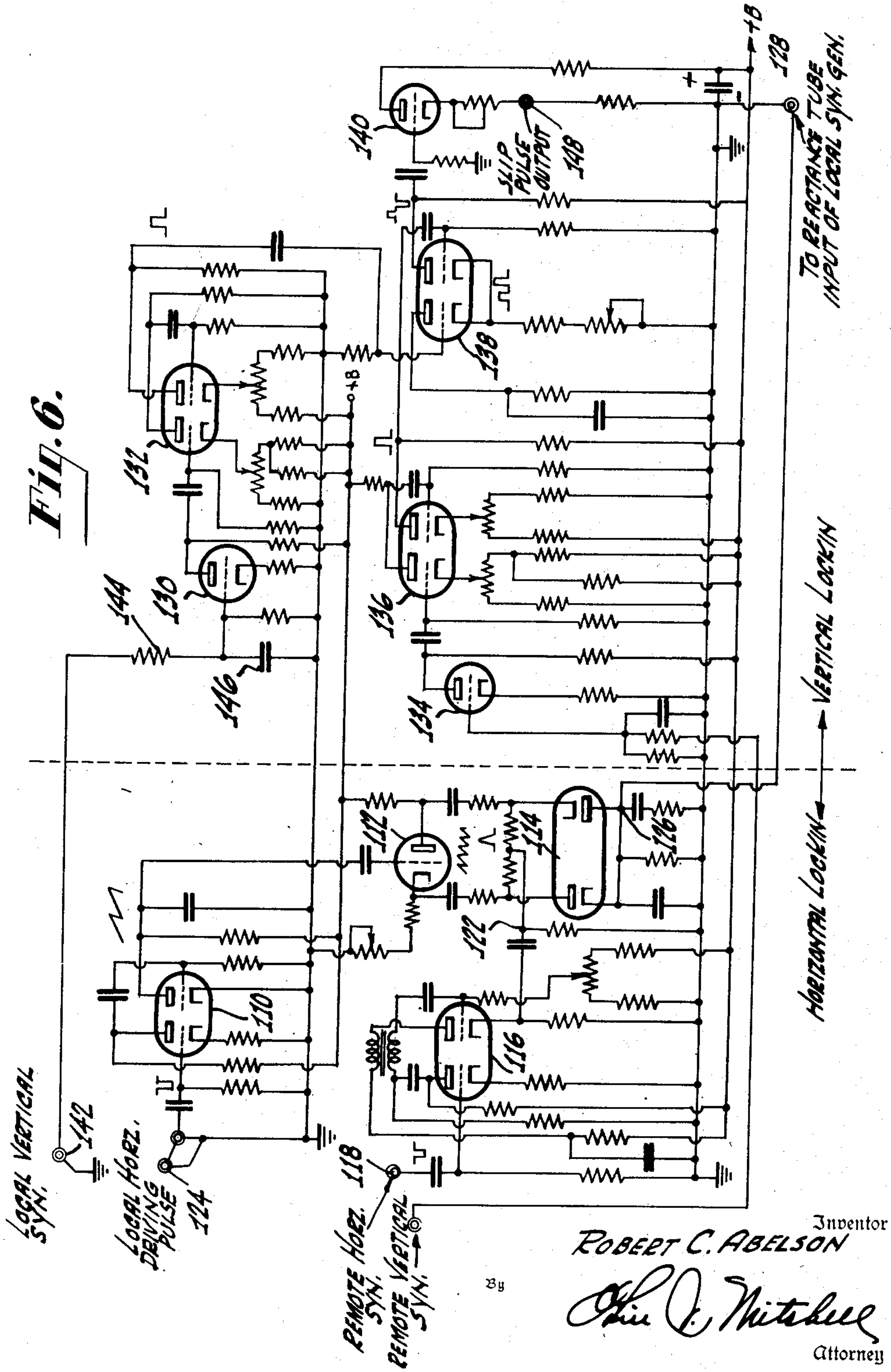
Figure 6 is a schematic representation of one form of the present invention as applied to the system of Figure 1.

It is further evident that the use of the sync gate of Fig. 3 in establishing horizontal or line lock-in between the remote and vertical sync generators is not absolutely necessary, since well-known A. F. C. comparator bridge circuits could be used to give satisfactory results. Such a latter arrangement is shown in Fig. 6, wherein there is schematically represented a complete comparator circuit for both remote and local horizontal vertical sync information as may be used in connection with the sync generator circuit of Fig. 1. For example, lock-in between the remote horizontal sync and the local master oscillator is accomplished by discharge tubes 110, 112, 114 and 116, which are connected in a typical pulse-sawtooth frequency comparator bridge circuit. The remote horizontal sync as obtained, for example, in Fig. 2, is applied to the input terminal of the blocking oscillator circuit associated with discharge tube 116. This blocking oscillator circuit is adapted to appear at the regular line frequency of 15,750 C. P. S. The pulse output of the blocking oscillator 116 appearing at terminal 122 is applied to the center of the conventional bridge circuit associated with tube 114. The bridge circuit 114 compares the frequency of the pulse from the blocking oscillator 116 with the push-pull version of a sawtooth wave form developed across the amplifier 112. This sawtooth wave form is in turn held in synchronism with the local horizontal driving pulse from the local sync generator component 19 in Fig. 1. Driving pulses are applied to terminal 124 of the sawtooth making circuit associated with discharge tube 110. Thus the direct current output of the comparative discharge tube 114 appearing at terminal 126 will be suitable for control of the reactance tube of the master oscillator 10 in Fig. 1. This output voltage appearing at terminal 128 of the system of Fig. 6 may be connected to another terminal 130 of the reactance tube input switch 48 in Fig. 1. This form of automatic frequency control circuit is well known in the art and needs no further description.

The vertical sync pulse subtractive comparator circuit of Fig. 4 is accordingly schematically represented as part of the system of Fig. 6 and comprises discharge tubes 130, 132, 134, 136, 138 and 140. In accordance with the description of Fig. 4 the local vertical sync pulse applied to terminal 142 is applied to the integrating circuit comprising elements 144 and 146 whose output is applied to the input of the amplifier tube 130. The integrated local vertical sync appearing at the output of tube 130 is then applied to any conventional form of limiter circuit such as is shown in connection with discharge tube 132. The limited and cleaned-up local vertical sync is then applied to one input of the subtractive mixer tube 138. Correspondingly the remote horizontal sync is similarly treated by the circuits associated with discharge tubes 134 and 136 whose output is applied to the other input of the subtractive mixer circuit associated with tube 138. The subtractively combined signal appearing at the output of discharge tube 138 is then applied to the input of the cathode follower tube 140 so that low impedance delivery of the desired slip pulse signal may be made at the output terminal 148. Output terminal 148 of course will then be coupled with the slip pulse input terminal D of discharge tube 20 in Fig. 1.

It is manifest that although specific circuit arrangements have been indicated in Fig. 6 which are useful in the practice of the present invention, many modifications of the circuits as well as equivalent substitutions for portions thereof may be made without in any way affecting the successful operation of the automatic synchronizing lock-in action of the present invention.

Having thus described my invention, what I claim is:

1. In a synchronizing system for effecting "lock-in" between local and remote television sync generators, a first and a second composite wave sync generator, each generator including a base oscillator from which is synchronously derived a high and low-frequency component for each composite wave, said second composite wave low-frequency component being related to its respective base oscillator by a frequency divider mechanism having a predetermined value of divisor, means for deriving a timing signal from said first composite wave high-frequency component, means for synchronizing said second base oscillator with said timing signal, means for intermittently and momentarily altering the divisor of said frequency divider mechanism, means for electrically comparing the timing of said first wave low-frequency component with the timing of said second wave low-frequency component to derive a control signal, and means responsive to said control signal for actuating said divisor altering means such to effect that timing slippage of said second wave low-frequency component relative to its respective base oscillator necessary to establish coincidence of the low-frequency components of said first and second waves.

2. In a synchronizing system for effecting "lock-in" between local and remote television sync generators, a first and a second composite wave sync generator, each generator including a base oscillator from which is synchronously derived a high and low-frequency component for each composite wave, said first composite wave low-frequency component being related to its respective base oscillator by a frequency divider mechanism having a predetermined value of divisor, means for deriving a timing signal from said second composite wave high-frequency component, means for synchronizing said first base oscillator with said timing signal, means for intermittently and momentarily altering the divisor of said frequency divider mechanism, means for electrically subtracting the low-frequency component of said first and second waves to produce a control signal whose duration is an inverse function of the degree of coincidence at any time existent between said first and second wave low-frequency components, and means responsive to said control signal for actuating said divisor altering means to a degree which is a positive function of the duration of said control signal.

3. In a synchronizing system for effecting "lock-in" between a local and remote television sync generator both of substantially the same timing characteristic such as to each produce an odd and even frame composite sync signal including horizontal and vertical pulses and representing an interlaced scanning raster, the local sync generator having a master oscillator productive of a base signal discretely related in frequency to both the desired local horizontal and vertical sync pulses, the combination of, means for receiving remote composite signal and separating therefrom horizontal and vertical sync pulses, means for conditionally and synchronously controlling said local master oscillator with separated remote horizontal sync pulses, a frequency dividing circuit in said local sync generator, the input of said dividing network being supplied with signals derived from the output of said master oscillator while the output of said dividing network is coupled to a local vertical sync pulse shaping network, voltage responsive means connected with said frequency dividing circuit for interrupting the timing schedule normally existing between the output signal of said divider and the output signal of said master oscillator, means for electrically comparing the timing of said local and remote vertical sync signals to develop an index voltage, and connections applying said index voltage to said voltage responsive interrupting means such to automatically effect that timing slippage of said local vertical sync signal relative to said local master oscillator necessary to establish coincidence of remote and local vertical sync pulses.

4. In a synchronizing system for effecting "lock-in" between a local and remote television sync generator both of substantially the same timing characteristic such as to each produce an odd and even frame composite sync signal including horizontal and vertical pulses and representing an interlaced scanning raster, the local sync generator having a master oscillator productive of a base signal discretely related in frequency to both the desired local horizontal and vertical sync pulses, the combination of, means for receiving remote composite signal and separating therefrom horizontal and vertical sync pulses, means for conditionally and synchronously controlling said local master oscillator with separated remote horizontal sync pulses, a frequency dividing circuit in said local sync generator, the input of said dividing network being supplied with signals derived from the output of said master oscillator while the output of said dividing network is coupled to a local vertical sync pulse shaping network, voltage responsive means connected with said frequency dividing circuit for interrupting the timing schedule normally existing between the output signal of said divider and the output signal of said master oscillator, means for electrically subtracting local vertical sync and remote vertical sync to obtain a control pulse whose duration is an inverse function of the degree of coincidence at any time existent between said local and remote vertical sync, and connections applying said control pulse to said voltage responsive interrupting means such interruption of said dividing circuit timing schedule is effected to a degree which is a positive function of the duration of said control pulses.

5. Apparatus according to claim 4 wherein said frequency divider circuit is of the threshold-multivibrator variety comprising in part a threshold actuated multivibrator, a storage circuit applied across the input to said multivibrator, a rectifying circuit having its output connected in storage relationship with said storage circuit with means for applying the output of said master oscillator to the input of said rectifying circuit, and wherein said voltage responsive interrupting means comprises an electronic switch for interrupting the application of master oscillator output signal to the input of said rectifying means.

6. In a synchronizing system for effecting "lock-in" between a local and remote television sync generator both of substantially the same timing characteristic such as to each produce an odd and even frame composite sync signal including horizontal and vertical sync pulses and representing an interlaced scanning raster, the local sync generator having a master oscillator productive of a base signal discretely related in frequency to both the desired local horizontal and vertical sync pulses, the combination of, means for receiving remote composite signal and separating therefrom horizontal and vertical sync pulses, means for conditionally and synchronously controlling said local master oscillator with separated remote horizontal sync pulses, a local vertical sync pulse shaping network adapted to transform signal energy at vertical sync pulse rate to wave energy having a desired vertical sync pulse contour, a frequency dividing circuit having a nominal dividing factor equal to the ratio between the local master oscillator frequency and the desired vertical sync pulse rate, connections applying the output of said dividing circuit to the input of said pulse shaping network, an electronic switch connected between the output of said master oscillator and the input of said frequency divider for conditionally interrupting application of the input signal to said frequency divider, an electrical subtracting circuit having its inputs supplied with remote and local vertical sync pulse so as to develop at its output a control pulse having a duration inversely proportional to the instantaneous degree of coincidence between said remote and local vertical sync pulses, and means for actuating said electronic switch in response to the duration of said control pulse.

7. Apparatus according to claim 6 wherein said electronic switch comprises a vacuum tube amplifier having at least an anode, cathode and control electrode, said amplifier having an anode-cathode output circuit and a control electrode cathode input circuit, and wherein said switch actuating means comprises coupling means between said subtracting circuit output and the input circuit of said amplifier with such control pulse polarity to render said control electrode more negative relative to said cathode during periods of non-coincidence between said vertical pulses.

8. In a television system employing a local and remote television sync generator each respectively productive of a separate set of horizontal and vertical sync components, said local sync generator comprising a master oscillator whose output is applied to frequency divider mechanism, the output of said frequency divider being in turn coupled to the input of a local vertical sync pulse shaping apparatus, a lock-in arrangement between said local and remote sync generators comprising in combination, means for deriving remote horizontal sync signal as formed by said remote sync generator, a synchronizing circuit connected with said local master oscillator adapted to time said oscillator in accordance with derived horizontal sync applied to said synchronizing circuit, means for conditionally applying derived remote horizonal sync to the input of said synchronizing circuit, circuitry for deriving remote vertical sync signal as formed by said remote sync generator, a subtractive algebraic combining circuit for electrical signals, connections for applying both remote and local vertical sync to said combining circuit to produce a control signal, a controllable signal communicatory circuit having input and output circuits between which circuits exists a conductive signal channel whose continuity is controllable through the influence of control signals applied to a control terminal of said circuit, connections applying the output control signal of said subtractive circuit to the control terminal of said communicatory circuit, and connections for serially placing said communicatory circuit input and output terminals between the output of said local master oscillator and the input of said local frequency divider.

ROBERT C. ABELSON.

References Cited in the file of this patent

UNITED STATES PATENTS

| Number | Name | Date |
| --- | --- | --- |
| 2,132,655 | Smith | Oct. 11, 1938 |
| 2,223,812 | Bedford | Dec. 3, 1940 |
| 2,258,943 | Bedford | Oct. 14, 1941 |
| 2,278,788 | Knick | Apr. 7, 1942 |
| 2,329,339 | De Baun | Sept. 14, 1943 |
| 2,350,536 | Schlesinger | June 6, 1944 |